United States Patent
Dittmar et al.

(10) Patent No.: US 10,400,827 B2
(45) Date of Patent: Sep. 3, 2019

(54) UNIVERSAL JOINT

(71) Applicants: Rico Dittmar, Schweinfurt (DE);
Padelis Katsaros, Schweinfurt (DE);
Volker Wendt, Üchtelhausen/Zell (DE)

(72) Inventors: Rico Dittmar, Schweinfurt (DE);
Padelis Katsaros, Schweinfurt (DE);
Volker Wendt, Üchtelhausen/Zell (DE)

(73) Assignee: Aktiebolaget SKF, Göteborg (SE)

( * ) Notice: Subject to any disclaimer, the term of this patent is extended or adjusted under 35 U.S.C. 154(b) by 43 days.

(21) Appl. No.: 14/870,611

(22) Filed: Sep. 30, 2015

(65) Prior Publication Data
US 2016/0091026 A1 Mar. 31, 2016

(30) Foreign Application Priority Data

Sep. 30, 2014 (DE) .................. 10 2014 219 858

(51) Int. Cl.
*F16D 3/41* (2006.01)
*F16D 3/38* (2006.01)
*F16C 33/78* (2006.01)

(52) U.S. Cl.
CPC ............ *F16D 3/41* (2013.01); *F16C 33/7809* (2013.01); *F16D 3/385* (2013.01); *F16D 2300/08* (2013.01)

(58) Field of Classification Search
CPC ........ F16D 3/41; F16D 3/385; F16D 2300/08; F16J 15/32
USPC .................................. 464/131, 133; 277/565
See application file for complete search history.

(56) References Cited

U.S. PATENT DOCUMENTS

| 2,773,366 | A | * | 12/1956 | Slaght | ................ | F16C 33/7809 |
| | | | | | | 464/131 X |
| 3,138,942 | A | | 6/1964 | Kayser | | |
| 3,377,820 | A | | 4/1968 | Smith, Jr. | | |
| 3,606,351 | A | * | 9/1971 | Hallerback | ............ | F16C 33/78 |
| | | | | | | 277/565 X |
| 4,932,923 | A | | 6/1990 | Thompson | | |
| 6,601,855 | B1 | | 8/2003 | Clark | | |
| 7,052,401 | B2 | * | 5/2006 | Mizuno | ................... | F16D 3/385 |
| | | | | | | 464/131 |

(Continued)

FOREIGN PATENT DOCUMENTS

| CA | 2189927 A1 | 5/1997 |
| CN | 201858272 U | 6/2011 |

(Continued)

*Primary Examiner* — Greg Binda
(74) *Attorney, Agent, or Firm* — Bryan Peckjian; SKF USA Inc. Patent Dept.

(57) ABSTRACT

A universal joint including a joint cross having a bearing journal supported in a trunnion bearing having a bearing bushing and a seal assembly including a one-piece seal body sealing the journal cross against the bearing bushing, the seal body having a first lip configured to form a dynamic seal on the bearing bushing or on a U-shaped sleeve connected to the bearing bushing, a second lip configured to form a dynamic seal on the bearing bushing or on the sleeve, a first arm of the sleeve being press-fit in a cylindrical receiving surface of the bearing bushing, or the sleeve having a section that is rounded or doubly corrugated in radial section, or wherein between the seal body and rolling elements of the trunnion bearing a separate ring part is disposed and pressed towards the rolling elements by at least one elastic element projecting from the seal body.

20 Claims, 5 Drawing Sheets

(56) References Cited

U.S. PATENT DOCUMENTS

| | | | | |
|---|---|---|---|---|
| 9,403,405 B2* | 8/2016 | Barberis | ............... | F16C 33/783 |
| 2008/0131044 A1* | 6/2008 | Bauer | ................... | F16D 3/385 |
| 2010/0028922 A1 | 2/2010 | Howe | | |
| 2010/0289226 A1 | 11/2010 | Kobayashi | | |
| 2016/0091027 A1* | 3/2016 | Katsaros | ................. | F16D 3/385 |
| | | | | 464/131 |

FOREIGN PATENT DOCUMENTS

| | | | |
|---|---|---|---|
| DE | 2556769 | B1 | 12/1976 |
| DE | 19542100 | C1 | 6/1997 |
| DE | 10302069 | A1 | 7/2004 |
| EP | 1477694 | A2 | 11/2004 |
| GB | 1211753 | A | 11/1970 |

* cited by examiner

UNIVERSAL JOINT

CROSS-REFERENCE

This application claims priority to German patent application no. 10 2014 219 858.5 filed on Sep. 30, 2014, the contents of which are fully incorporated herein by reference.

TECHNOLOGICAL FIELD

The disclosure relates to a universal joint having a joint cross/spider, which joint cross includes a plurality of bearing journals. Each of the bearing journals is supported in a bearing bushing by a trunnion bearing, and a seal assembly is provided for sealing the joint cross against the bearing bushing.

BACKGROUND

Universal joints, sometimes called Cardan joints, are generally provided with seals to protect the trunnion bearing, which bearing is usually embodied as a needle bearing. These seals must function in the presence of highly abrasive contaminants. For example, bearings used in motor vehicles, especially those that operate in dusty environments like construction zones, may be exposed to contaminants that can contaminate the universal joints.

To date inner and outer seals (two separate seal systems) have been used in universal joints. By way of example, reference is made to DE 103 02 069 A1 (family member of US 2006/125189) that shows separate inner and outer seals.

A universal joint of the above-mentioned type is also described in DE 195 42 100 C1. In addition, GB 1 211 753 A; US 2010/0289226 A1; U.S. Pat. No. 4,932,923 A; DE 25 56 769 B1 (family member of U.S. Pat. No. 4,094,517); U.S. Pat. No. 3,377,820 A; 6,601,855 B1; and 3,138,942 A disclose alternate solutions.

It has been found that elastomeric seal lips sometimes do not provide an optimal sealing against water, sand, and mud. Instead, adequate sealing can only be achieved by using an inner seal and an outer seal. This can easily lead to wear on the outer seal lip.

A disadvantage of conventional trunnion bearings, including those in the cited documents, is that they require the construction of a relatively expensive inner seal in order to ensure that penetrating dirt is kept away from the region of the trunnion bearing. Conventional assemblies that use two separate seal systems are thus expensive to manufacture and install.

SUMMARY

An aspect of the disclosure is to provide a universal joint of the above-described type such that an effective yet economical sealing function can be achieved.

The disclosure is characterized in that the sleeve is U-shaped in radial section, with the base of the U-shaped structure facing the rolling elements of the trunnion bearing. A first arm of the U-shaped structure is press-fit in the cylindrical receiving surface of the bearing bushing, or the sleeve includes a first arm extending in the axial direction as well as a section rounded in radial section, wherein the first arm is press-fit in a cylindrical outer surface of the bearing bushing, and wherein the first seal lip runs oriented radially inward on the rounded section, or the sleeve has a first arm extending in the axial direction and a section that is doubly corrugated (doubly folded/has first and second folded portions) in radial section, wherein the first arm is press-fit in a cylindrical receiving surface of the bearing bushing, wherein the first seal lip and a third seal lip are oriented radially inward and run on the doubly corrugated section offset in the radial direction, or between the seal body and the rolling elements of the trunnion bearing a separate ring part is disposed, which is pressed towards the rolling elements by at least one spring element.

The seal body is preferably comprised of polyurethane or of a thermoplastic elastomer (TPE).

The sleeve preferably includes a second arm, and a third radially inward oriented lip of the sealing body runs in a dynamically sealing manner on the radially outer lying surface of the second arm.

The first seal lip or the third seal lip may be formed on ends of axially extending projections that extend away from the base body of the seal body and towards the trunnion bearing.

Furthermore, the seal body can include a fourth seal lip that runs on an end side of the bearing bushing in a dynamically sealing manner.

The first arm of the sleeve can project past the axial end of the bearing bushing and protrude into an annular space that is formed in the seal body. The first arm of the sleeve can include an end section extending radially, preferably outward, which is placed in the annular space.

According to an alternative configuration of the disclosed universal joint, the sleeve element can be omitted and a cost-effective component such as a ring element can be used. The ring part is preferably embodied as a hardened steel disc. The ring element can be pressed toward the rolling elements by the spring element, and the spring element can comprise rubber knobs between the ring element and a portion of the seal body. In this way a rattling or joggling of the rolling elements can be effectively minimized or prevented.

Another aspect of the disclosure comprises a universal joint including a joint cross, the joint cross including a plurality of bearing journals, each bearing journal being supported in a trunnion bearing having a bearing bushing and rolling elements. The universal joint also includes a seal assembly for sealing the journal cross against the bearing bushing. The seal assembly includes a seal body configured to form a static seal with the joint cross, and the seal assembly includes a sleeve connected to the bearing bushing for conjoint rotation therewith. The seal body also includes a first seal lip configured to press radially inwardly to form a dynamic seal on the sleeve and a second seal lip configured to press radially inwardly to form a dynamic seal on the sleeve. The seal body, including the first seal lip and the second seal lip, is configured as a one-part polymer component, and only a single seal body is mounted on each bearing journal. The sleeve is press-fit in a cylindrical receiving surface of the bearing bushing and comprises a first annular channel having a base facing the rolling elements of the trunnion bearing and an opening facing axially away from the trunnion bearing. A first portion of the seal body extends into the first annular channel, and the first seal lip of the seal body is configured to form a dynamic seal with an interior wall of the first annular channel and the second seal lip of the seal body is configured to form a dynamic seal against the sleeve at a location radially outward of the first seal lip.

In other aspects of the disclosure, the universal joint includes a third seal lip configured to form a dynamic seal with a radially outer surface of the sleeve, and the sleeve may include a radially outwardly extending flange projecting into a opening in the seal body. The first seal lip may be located axially or radially inward of the second seal lip, and the second seal lip may be located axially or radially inward of the third seal lip. The universal joint may also include a fourth seal lip configured to form a dynamic seal with the bearing bushing.

In other aspects of the invention, the sleeve may include a second annular channel having a base facing the rolling elements of the trunnion bearing and an opening facing axially away from the trunnion bearing, and the location radially outward of the first seal lip may be in the second annular channel.

A further aspect of the disclosure comprises a universal joint including a joint cross, the joint cross including a plurality of bearing journals, each bearing journal being supported in a trunnion bearing having a bearing bushing and rolling elements. The universal joint also includes a seal assembly for sealing the journal cross against the bearing bushing. The seal assembly includes a seal body configured to form a static seal with the joint cross, and the seal assembly includes a sleeve press-fit in the bearing bushing for conjoint rotation therewith. The sleeve has at least one annular channel having a base facing the rolling elements of the trunnion bearing and an opening facing axially away from the trunnion bearing. The seal body includes a first seal lip configured to form a dynamic seal in the at least one annular channel and a second seal lip configured to form a dynamic seal in the at least one annular channel. The seal body, including the first seal lip and the second seal lip, is configured as a one-part polymer component, and only a single seal body is mounted on each bearing journal.

In a further aspect, the at least one annular channel comprises a first annular channel and a second annular channel and the first seal lip is configured to form a seal in the first annular channel and the second seal lip is configured to form a seal in the second annular channel. Furthermore, the first seal lip may be located at the end of a first arm projecting from the seal body into the first annular channel and the second seal lip may be located at the end of a second arm projecting from the seal body into the second annular channel.

The proposed seal assembly thus represents an optimized sealing concept for universal-joint bushings.

The disclosure is based on a recognition that a buffer-seal function against water, dirt, and sand can be provided that performs an important sealing function. It is advantageous in this context to use polyurethane or a thermoplastic elastomer (TPE) as the elastomer for the seal material, which have a high resistance against water, dirt, and sand.

The disclosed concept provides that the inner sealing function can also be entirely assumed by polyurethane or thermoplastic elastomer (TPE) and the necessary seal lips can protrude from these seal elements into the inner sealing region. This has the advantage that the inner structure does not require any vulcanized-on seal lips, but rather at most requires a metal-plate part (sleeve) as the counter-surface for the seal lips to slide against. This in turn makes the seal more economical to manufacture or implement.

Polyurethane or a thermoplastic elastomer (TPE) is a very suitable material for the seal element, because these materials are resistant to dirt and water. The use of these materials leads to an improved sealing function. The disclosed concept provides that the entire seal system, i.e., the seal system formerly provided by separate inner and the outer seal elements, including all provided or required seal lips, can be provided by the buffer seal, and in this manner eliminates the need for a second, separate inner seal.

Accordingly the seal system can be manufactured more economically, without the proven and required sealing function having to be omitted. The integrated solution of the inner and outer seal of the universal joint bearing thus represents an embodiment of a seal against entry of water and dirt that is optimized in terms of function and cost.

The disclosed concept can be used for all types of universal joints, although applications in the motor vehicle industry are particularly preferred.

The disclosed arrangement also, advantageously, effectively retains lubricant, i.e., in particular lubricating grease. The seal is well-anchored in the bushing and thus stable. The rollers of the trunnion bearing can be axially loaded and remain precisely aligned.

Dirt is effectively kept out, and the design of the seal assembly allows the bearing to be lubricated with grease (see the grease flow depicted in FIG. 4).

The buffer seal can be prepositioned well, and this helps ensure a sealing or anchoring on the cross.

BRIEF DESCRIPTION OF THE DRAWINGS

Exemplary embodiments of the disclosure are depicted in the drawings.

DETAILED DESCRIPTION

Figure 1:
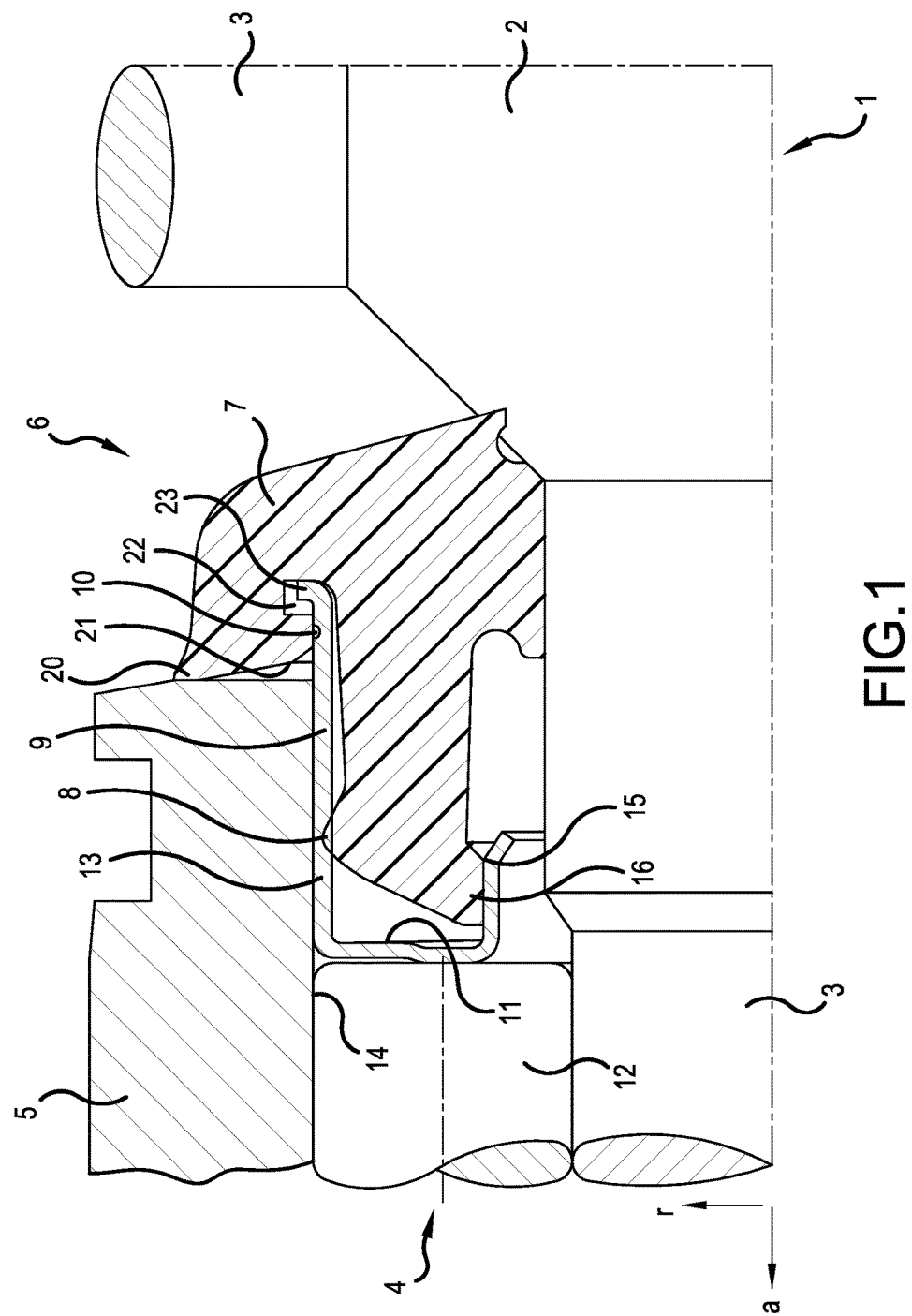
FIG. 1 is a radial sectional view of part of a universal joint according to the present disclosure that includes a seal assembly for sealing a section of a joint cross with respect to a bearing bushing.

FIG. 1 illustrates two of four bearing journals 3 of a universal joint 1 that includes a joint cross 2. The bearing journals 3 are supported in respective trunnion bearings 4. The trunnion bearings 4 are housed in bearing bushings 5, or the bearing bushings 5 may be components of the trunnion bearings 4. In this embodiment, the trunnion bearing 4 is embodied as a needle bearing.

A seal assembly 6 for sealing the trunnion bearing 4 of each bearing bushing 5 is located on the joint cross 2.

The seal assembly 6 includes a seal body 7 configured as a one-piece element (a monoblock) that sits on the joint cross 2 in a statically sealing manner. In the exemplary embodiment of FIG. 1 the seal body 7 includes a first radially outward oriented seal lip 8, configured to run in a dynamically sealing manner on the bearing bushing 5, or more precisely, on a sleeve 9 that is connected to the bearing bushing 5 so that the sleeve 9 rotates conjointly with the bearing bushing 5. The seal body 7 further includes a second radially inward oriented seal lip 10 that runs in a dynamically sealing manner on the bearing bushing 5—in this embodiment also on the sleeve 9. As can be seen, the seal body 7 including the first and second seal lips 8 and 10 is configured as a one-part polymer component. The seal body is specifically comprised of polyurethane; a thermoplastic elastomer (TPE) could be used as an alternative. As can further be seen, the seal assembly 6 is the only one on a give arm of the joint cross, and the seal assembly 6 does not include any further seal bodies.

It can be seen from FIG. 1 that the sleeve 9 is a metal-plate part that is U-shaped in radial section and forms an axially outwardly facing channel. The base 11 of the U-shaped structure faces the rolling elements 12 (i.e., the needles) of the trunnion bearing 4. A first, radially outer arm 13 of the sleeve 9 is press fitted in a cylindrical receiving surface 14 of the bearing bushing 5. A second, radially inner arm 15 of the sleeve 9 points in axial direction a, and a third radially inner oriented seal lip 16 of the seal body 7 runs on the radially outer surface of the second arm 15.

It is also to be noted that in the exemplary embodiment a fourth seal lip 20 is formed on the seal body 7, which fourth seal lip 20 runs on an axially facing end side 21 of the bearing bushing 5.

An annular space 22 is formed in the seal body 7, and the first arm 13 of the sleeve 9 projects into this space. The first end of the arm 13 has an end section 23 that extends radially outward. The seal can thereby be attached in the installation position until assembly at the customer site, whereby the assembly is simplified. The sealing effect can thereby be improved.

Figure 2:
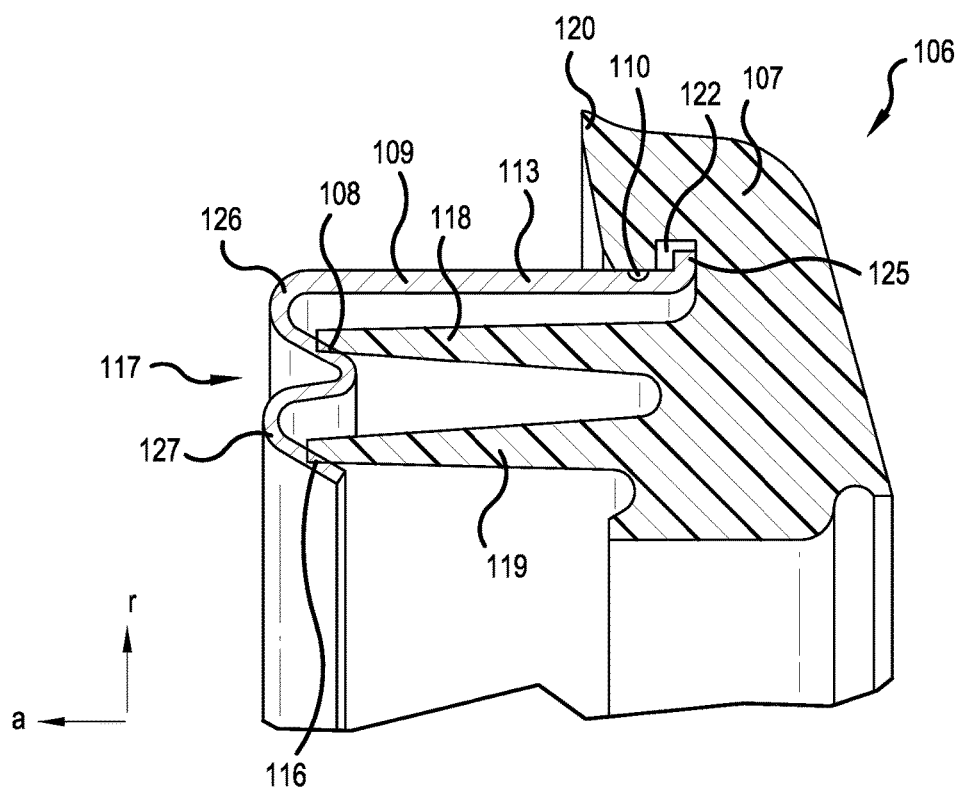
FIG. 2 is a radial sectional view of another embodiment of a seal assembly according to the present disclosure.

An alternate embodiment is illustrated in FIG. 2. In this embodiment, the seal assembly 106 comprises a seal body 107 that includes two axial projections 118 and 119 (first and second projections) that, respectively, slidingly support the first seal lip 108 and the second seal lip 116 on end portions of the first and second projections 118, 119. A third seal lip 110 presses radially inwardly on a radially outer portion of the sleeve 109 and a fourth seal lip 120 presses against the bearing bushing.

The sleeve 109 in this embodiment also has a first arm 113, and an end section 117 of the arm that extends generally radially inward is folded or undulated in a manner that produces first and second generally axially facing surfaces for slidingly supporting the first and second axial projections 118, 119. The two axial projections 118 and 119 are radially offset from each other in direction r. The end section 117 of the sleeve also includes two portions 126 and 127 that are axially offset from one another by. Otherwise, this embodiment is generally similar to that depicted in FIG. 1.

Of course, variations in construction are also possible. Thus, for example, the use of only one seal lip 108 or 116 is also possible.

Figure 3:
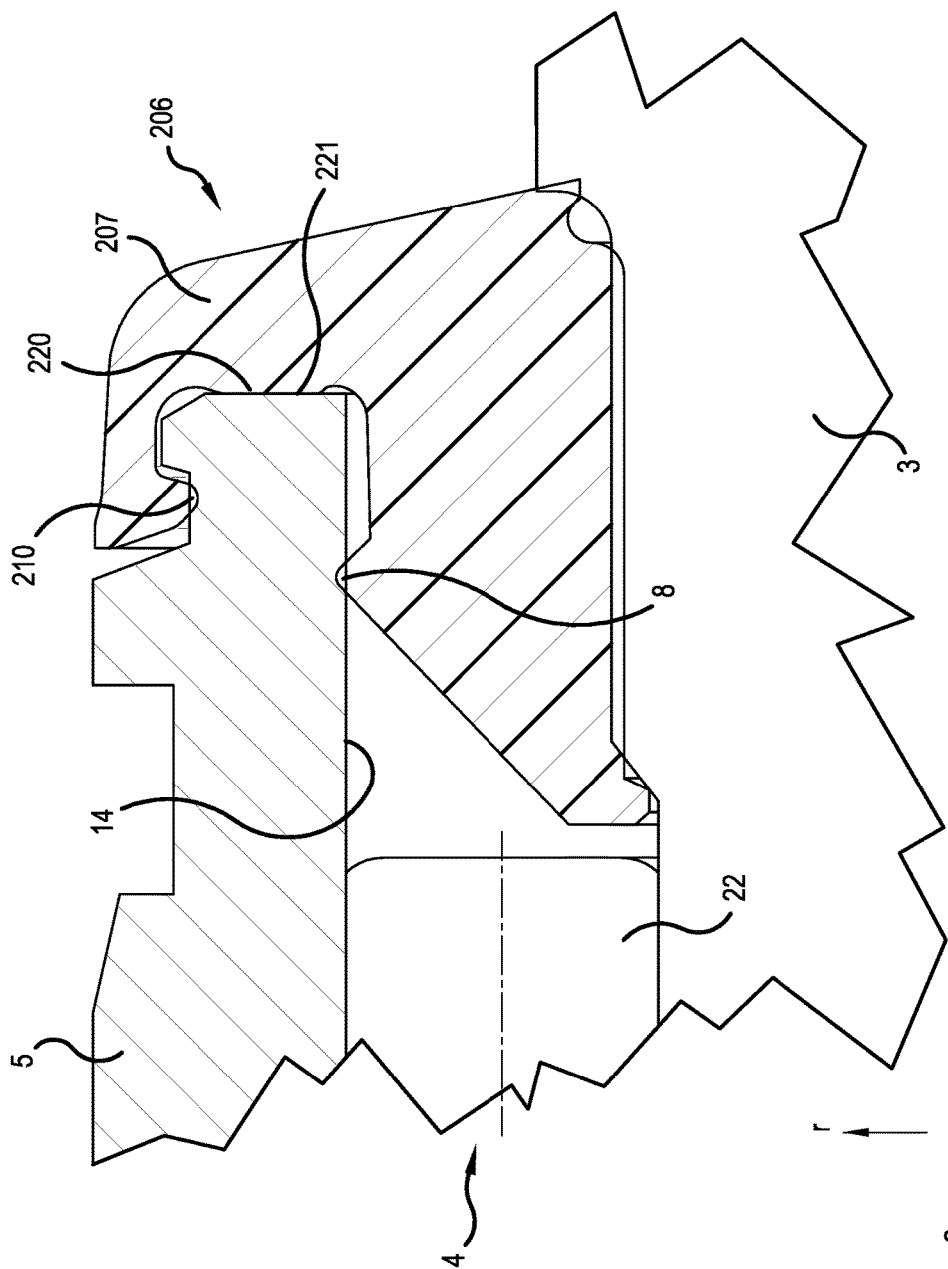
FIG. 3 is a radial sectional view of another embodiment of a seal assembly according to the present disclosure.

A somewhat different design of the invention can be seen in FIG. 3. Here the seal assembly 206 comprise a seal body 107 that includes only a first seal lip 208 and a second seal lip 210 as well as a third seal lip 220. The third seal lip 220 can alternatively be regarded as a seal region in the sense that it makes contact with bushing 5 over a wider region than the other lips. The third seal lip 220 or the seal region also function to transfer an assembly/installation force to the seal. Otherwise, the construction corresponds to those depicted in FIGS. 1 and 2. However, the third seal lip 220, which runs on the end side 221 of the bearing bushing 5 is different than the earlier embodiments.

Figure 4:
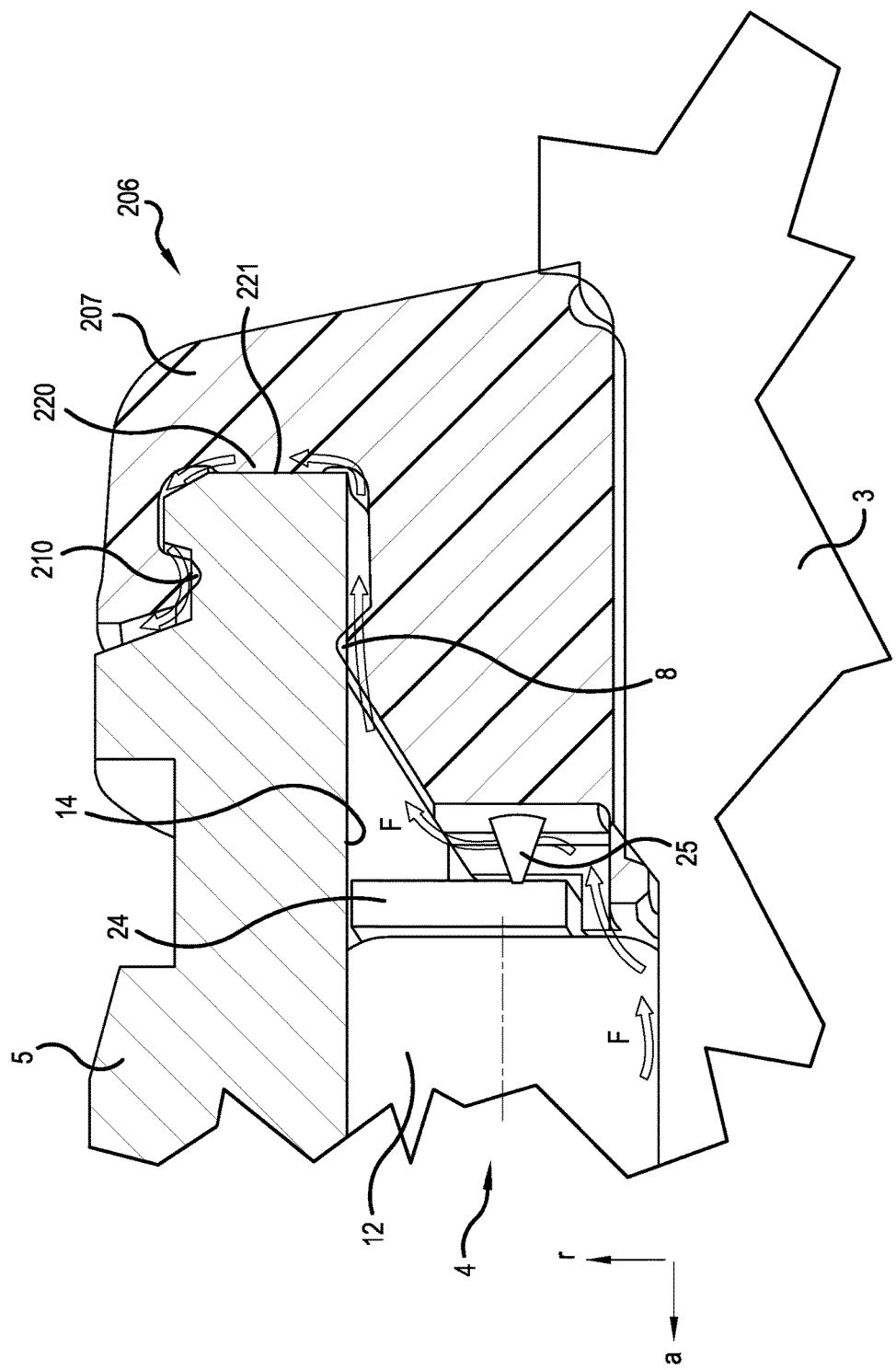
FIG. 4 is a radial sectional view of another embodiment of a seal assembly according to the present disclosure.

A variant of the seal assembly 206 of FIG. 3 is depicted in FIG. 4. In this embodiment, a ring part 24, which can be configured as a plastic ring or as a hardened steel disc, is disposed between the seal body 207 and the rolling elements 12. Otherwise, the design corresponds to that of FIG. 3.

Since in the embodiments of FIG. 4 the ring 24 is still to be cushioned, i.e., since a certain pressing force is also to be exerted on the end side of the rolling elements 12, in the exemplary embodiment according to FIG. 4 small knobs 25 are provided as spring elements. These can exert an axial force on the ring 25.

Otherwise, a grease flow F is indicated in FIG. 4 by arrows, which grease flow F takes place if the universal joint is relubricated using a grease gun or using another type of lubricating system. As can be seen, the grease flows through the entire seal assembly 6 up to the grease outlet in the region of the third seal lip 210.

Figure 5:
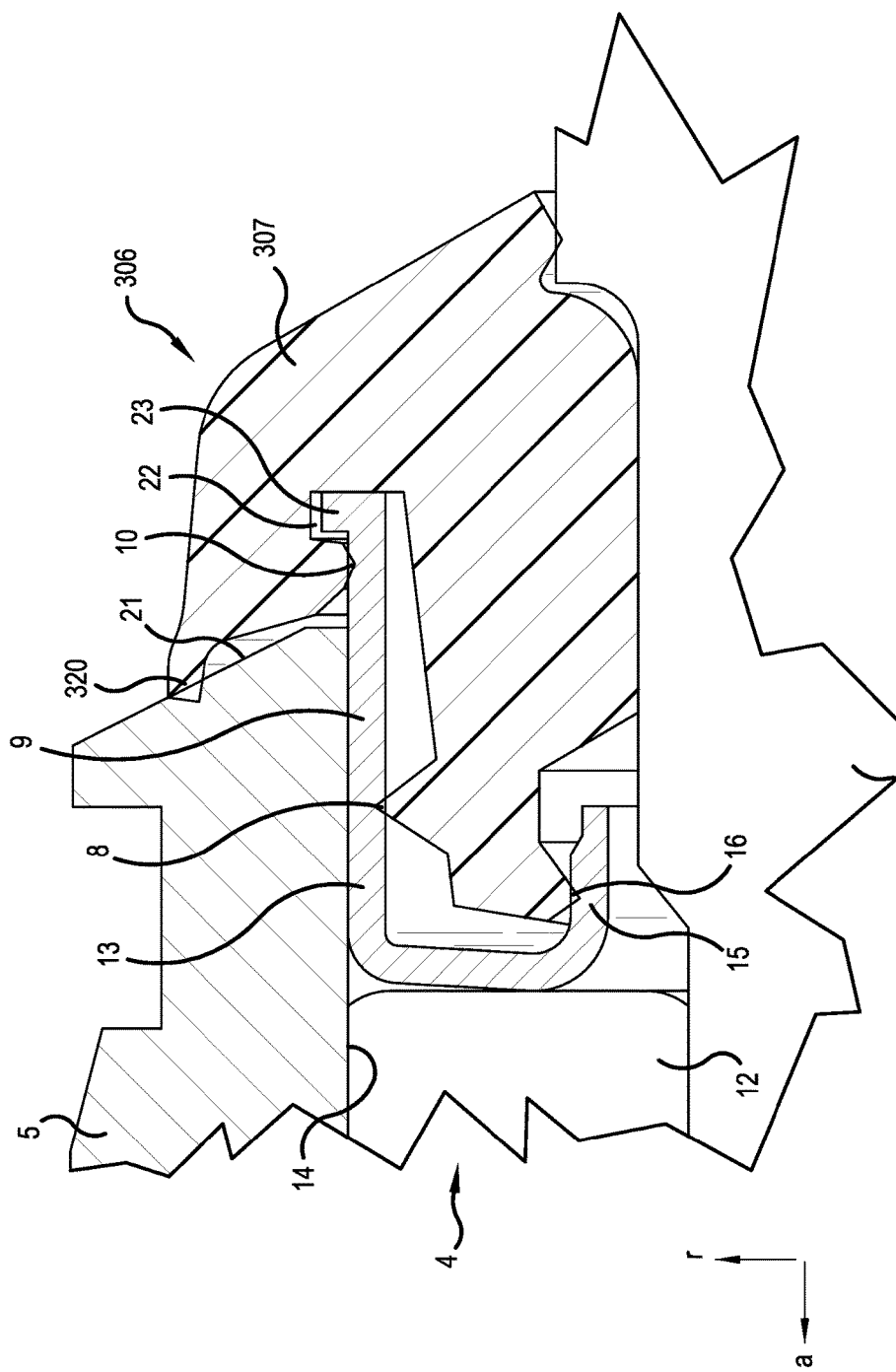
FIG. 5 is a radial sectional view of another embodiment of a seal assembly according to the present disclosure.

FIG. 5 illustrates another embodiment of a seal assembly 306 having a seal body 307 having a first seal lip 8, a second seal lip 10, a third seal lip 16 and a fourth seal lip 320. i The region of the fourth seal lip 320 is configured somewhat differently from the first and second embodiments. In this case, the fourth seal lip 320 is cantilevered or somewhat more free so that it has greater flexibility or elasticity.

This configuration helps ensure that the fourth seal lip 320—as depicted—abuts on the end side of the bearing bushing 5 even in the case of large deformations of the universal joint. In the drawing figures, the seal lips are shown extending into their respective sealing surfaces. Obviously, the seal lips will flex so as to ride on their respective seal surfaces. They are shown in their untensioned state to provide an indication of the how much flexing is required to make them sit on their guiding surfaces when installed. This helps ensure that seal lip 10 maintains a proper seal even with large deformations of the fourth seal lip 320.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved universal joints.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A universal joint including a joint cross, wherein the joint cross includes a plurality of bearing journals, wherein each bearing journal is supported in a trunnion bearing having a bearing bushing and rolling elements, and wherein a seal assembly is disposed for sealing the journal cross against the bearing bushing, wherein the seal assembly includes a seal body configured to form a static seal with the joint cross, wherein a sleeve is connected to the bearing bushing for conjoint rotation therewith, wherein the seal body includes at least one first seal lip configured to press radially inwardly to form a dynamic seal on the sleeve,
wherein the seal body includes at least one second seal lip configured to press radially inwardly to form a dynamic seal on the sleeve,
wherein the seal body, including the at least one first seal lip and the at least one second seal lip is configured as a one-part polymer component,
wherein only a single seal body is mounted on each bearing journal, and
wherein the sleeve has a first arm extending in the axial direction and a section that is doubly corrugated in radial section, and wherein the first arm is press-fit in a cylindrical receiving surface of the bearing bushing, and wherein the first seal lip and the second seal lip run on the doubly corrugated section and are offset in the radial direction.

2. The universal joint according to claim 1, wherein the seal comprises polyurethane or thermoplastic elastomer.

3. The universal joint according to claim 1, wherein a third radially inward oriented seal lip of the seal body runs on a radially outer facing surface of the first arm.

4. The universal joint according to claim 3, wherein the first seal lip is formed at an end of a first projection extending axially toward the trunnion bearing from a base body of the seal body and the second seal lip is formed at an end of a second projection extending axially from the base body of the seal body toward the trunnion bearing.

5. The universal joint according to claim 4, wherein the first arm of the sleeve projects beyond an axial end of the bearing bushing and protrudes into an annular space in the seal body.

6. The universal joint according to claim 1, wherein the seal body includes a third seal lip, which runs on an end side of the bearing bushing in a dynamically sealing manner.

7. The universal joint according to claim 1, wherein the first arm of the sleeve projects beyond an axial end of the bearing bushing and protrudes into an annular space in the seal body.

8. The universal joint according to claim 7, wherein the first arm of the sleeve includes a radially outward extending end section that projects into the annular space.

9. A universal joint including a joint cross, wherein the joint cross includes a plurality of bearing journals, wherein each bearing journal is supported in a trunnion bearing having a bearing bushing and rolling elements, and wherein a seal assembly is disposed for sealing the journal cross against the bearing bushing,
wherein the seal assembly includes a seal body configured to form a static seal with the joint cross,
wherein the seal assembly includes a sleeve connected to the bearing bushing for conjoint rotation therewith,
wherein the seal body includes a first seal lip configured to press radially inwardly to form a dynamic seal on the sleeve,
wherein the seal body includes a second seal lip configured to press radially inwardly to form a dynamic seal on the sleeve,
wherein the seal body, including the first seal lip and the second seal lip is configured as a one-part polymer component,
wherein only a single seal body is mounted on each bearing journal,
wherein the sleeve is press-fit in a cylindrical receiving surface of the bearing bushing and comprises a first annular channel having a base facing the rolling elements of the trunnion bearing and an opening facing axially away from the trunnion bearing, and
wherein a first portion of the seal body extends into the first annular channel, the first seal lip of the seal body being configured to form a dynamic seal with an interior wall of the first annular channel and the second seal lip of the seal body being configured to form a dynamic seal against the sleeve at a location radially outward of the first seal lip.

10. The universal joint according to claim 9, including a third seal lip configured to form a dynamic seal with a radially outer surface of the sleeve.

11. The universal joint according to claim 10, wherein the sleeve includes a radially outwardly extending flange projecting into a opening in the seal body.

12. The universal joint according to claim 10, wherein the first seal lip is located axially outward of the second seal lip and the second seal lip is located axially outward of the third seal lip.

13. The universal joint according to claim 12, wherein the first seal lip is located radially inward of the second seal lip and the second seal lip is located radially inward of the third seal lip.

14. The universal joint according to claim 10, wherein the first seal lip is located radially inward of the second seal lip and the second seal lip is located radially inward of the third seal lip.

15. The universal joint according to claim 10, including a fourth seal lip configured to form a dynamic seal with the bearing bushing.

16. The universal joint according to claim 9, wherein the sleeve includes a second annular channel having a base facing the rolling elements of the trunnion bearing and an opening facing axially away from the trunnion bearing and wherein the location radially outward of the first seal lip is in the second annular channel.

17. A universal joint including a joint cross, wherein the joint cross includes a plurality of bearing journals, wherein each bearing journal is supported in a trunnion bearing having a bearing bushing and rolling elements, and wherein a seal assembly is disposed for sealing the journal cross against the bearing bushing,
wherein the seal assembly includes a seal body configured to form a static seal with the joint cross,
wherein the seal assembly includes a sleeve press-fit in the bearing bushing for conjoint rotation therewith, the sleeve having at least one annular channel having a base facing the rolling elements of the trunnion bearing and an opening facing axially away from the trunnion bearing,
wherein the seal body includes a first seal lip configured to form a dynamic seal in the at least one annular channel and a second seal lip configured to form a dynamic seal in the at least one annular channel,
wherein the seal body, including the first seal lip and the second seal lip is configured as a one-part polymer component, and
wherein only a single seal body is mounted on each bearing journal.

18. The universal joint according to claim 17, wherein the at least one annular channel comprises a first annular channel and a second annular channel and wherein the first seal lip is configured to form a seal in the first annular channel and the second seal lip is configured to form a seal in the second annular channel.

19. The universal joint according to claim 18, wherein the first seal lip is located at the end of a first arm projecting from a base body of the seal body into the first annular channel and the second seal lip is located at the end of a second arm projecting from the base body of the seal body into the second annular channel.

20. The universal joint according to claim 17, wherein the first seal lip is located axially outward of the second seal lip.

* * * * *